United States Patent
Lipkind

[11] 3,909,135
[45] Sept. 30, 1975

[54] MICROSCOPE COMPARATOR

[75] Inventor: Harry I. Lipkind, Bethesda, Md.

[73] Assignee: The United States of America, Washington, D.C.

[22] Filed: Mar. 21, 1974

[21] Appl. No.: 453,494

[52] U.S. Cl. .................. 356/172; 356/156; 350/285
[51] Int. Cl.² .......................................... G01B 11/26
[58] Field of Search ............ 350/285; 356/156, 167, 356/172

[56] References Cited
UNITED STATES PATENTS

| | | | |
|---|---|---|---|
| 843,414 | 2/1907 | Northrup | 350/285 X |
| 3,315,563 | 4/1967 | Harper et al. | 350/285 |
| 3,739,370 | 6/1973 | Wolff | 350/285 X |
| 3,825,343 | 7/1974 | Moore | 356/156 |

*Primary Examiner*—Ronald L. Wibert
*Assistant Examiner*—Paul K. Godwin
*Attorney, Agent, or Firm*—Witherspoon and Lane

[57] ABSTRACT

Microscope comparator apparatus is disclosed. The apparatus includes a point source of light which may be a laser source or other light source in combination with suitable optic devices to provide the point source. The light is reflected from two mirrors and then to a microscope image. Means are provided to move these mirrors in such a manner that the pin point light source can be moved to any desired position on the microscope image. Means are also provided to sense a given position of the pin point source on the image. This sensed position information may be fed to a computer to compute measurement information about the microscope image.

19 Claims, 2 Drawing Figures

U.S. Patent Sept. 30,1975 3,909,135

MICROSCOPE COMPARATOR

The invention described herein may be manufactured, used, and licensed by or for the Government for Governmental purposes without the payment to me of any royalties thereon.

BACKGROUND OF THE INVENTION

This invention relates to microscope comparators, and more particularly to microscope comparators capable of providing microscope image measurements to a high degree of accuracy.

Microscope comparators are, of course, known in the art. These devices are used to make measurements on microscope images. While these devices can generally be used to make measurements on any microscope image, they are widely used by photo interpreters to make measurements on photographic images.

The prior art devices available to photo interpreters are rudimentary scales and rulers, or highly sophisticated electromechanical comparators. Obviously, the degree of accuracy that can be obtained by scales and rulers is somewhat limited. If highly accurate measurements are desired, the photo interpreter has to request the support of a photogrammetrist. This obviously takes additional time, thus delaying the work and increasing the cost of getting the job accomplished. Furthermore, this process may introduce errors thereby lowering the accuracy of the measurements, and yet the photogrammetrist was brought in to increase the accuracy. These errors may be kept to a minimum by having the photo interpreter and photogrammetrist work as a team, but this further increases the cost.

The microscope comparator apparatus of this invention provides photo interpreters with the ability to measure photograph imagery to a very high degree of accuracy without the necessity of relying on photogrammetrists. The photo interpreter alone can obtain measurements to a very high degree of accuracy with the apparatus of this invention. The microscope comparators of this invention are, however, not limited to use by photo interpreters for making photograph measurements. This invention can be used to take measurements on any microscope image.

SUMMARY OF THE INVENTION

Two embodiments of the invention are disclosed. Both embodiments use a light source that provides a very narrow beam of light and a pair of mirrors to direct the light beam to different positions on the object being viewed under a microscope. The light beam is directed by means of the mirrors to a lens barrel and down the barrel to the microscope and then to the object being viewed. One end of the lens barrel can be incorporated into the eyepiece, the body of the microscope, or in the camera port if the microscope is equipped with a camera port. The other end of this lens barrel is, of course, incorporated into the comparator of this invention.

In the first embodiment of the invention, each mirror is mounted on a hinge and a threaded shaft is associated with each mirror. The threaded shafts are moved inwardly or outwardly to move the mirrors and thereby move the beam on the microscope image. An encoder is associated with each of the threaded shafts. Each encoder senses the position of its associated shaft and provides an output indicative of the shaft position which is directly related to the position of the light on the microscope image. The output from each encoder is fed into a computer. Since the position of each shaft is directly related to the position of the light beam, the input of the computer is a measure of the x-y axes position of the light beam on the microscope image. By moving the beam to various positions on the microscope image and sensing each position, various information such as the length of a particular feature or the image or the distance between two points on the image can be determined.

In the second embodiment, one edge of each mirror is rigidly attached. Again, threaded shafts are provided with each mirror; however, these shafts bend the mirrors since each mirror is rigidly attached at one edge. By moving the shafts inwardly and outwardly, the bending of the mirrors is increased and decreased, respectively. For a particular degree of bending of the mirrors, the light spot falls on a given position of the microscope image. Thus, by changing the degree of bending of the mirrors, the light spot is moved to different positions on the image. Each mirror has strain gauge apparatus attached to it. The outputs from the strain gauges are directly related to the degree of bending and, therefore, to the position of the light spot on the microscope image. Thus, for each position of the light spot the strain gauges have a particular output which is related to the x-y axes position of the light spot on the microscope image. This position information is fed to a computer where it is processed to read out the desired information.

It is therefore an object of this invention to provide a microscope comparator.

It is still a further object of this invention to provide apparatus for making highly accurate measurements on a microscope image.

BRIEF DESCRIPTION OF THE DRAWING

The above mentioned and other objects of the invention will become readily apparent from the following detailed description of the invention when read in conjunction with the annexed drawing in which.

DETAILED DESCRIPTION OF THE INVENTION

Figure 1:
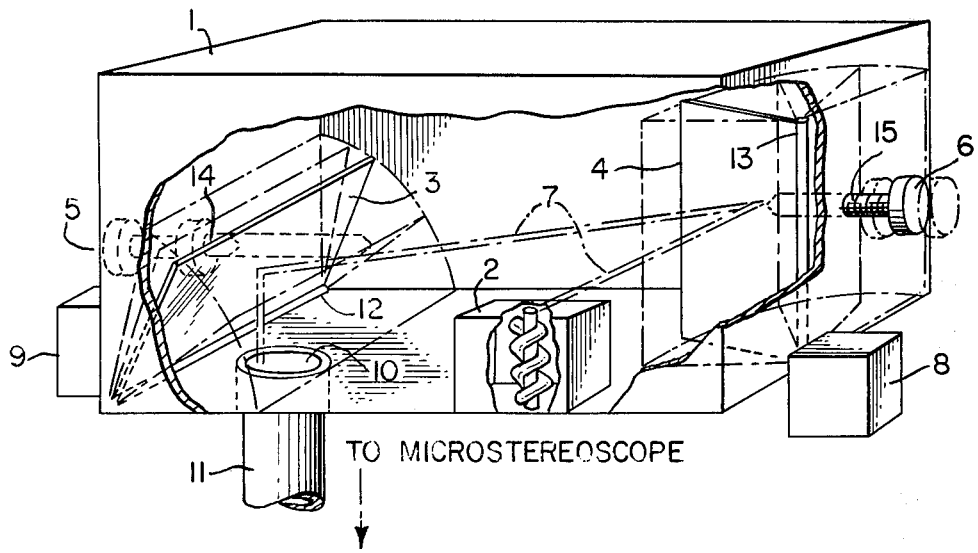
FIG. 1 shows a first embodiment of the invention.

Referring to the drawing, FIG. 1 shows a first embodiment of the invention. As shown in FIG. 1, this embodiment comprises a housing or box 1 containing a laser light source 2, a first mirror 3 and a second mirror 4. Mirror 3 is attached to a hinge 12 and mirror 4 is attached to a hinge 13. A threaded shaft or rod 14 is operatively coupled to mirror 3, and a threaded shaft or rod 15 is operatively coupled to mirror 4. Shaft 14 is provided with a knob 5 to facilitate turning of rod 14, and shaft 15 is similarly provided with a knob 6. An encoder 8 is operatively coupled to shaft 15 and an encoder 9 is operatively coupled to shaft 14. Encoders 8 and 9 are shown outside of housing 1. These encoders can conveniently be attached to the outside of end walls of housing 1, or can be placed inside housing 1, or can merely be free standing. However, as will be apparent, these encoders must be operatively coupled to their respective shafts. A lens barrel 11 having the lens 10 protrudes slightly into housing 1. The end of barrel 11 containing lens 10 can protrude slightly into housing 1, as shown, or the lens 10 end can be flush with the inside surface of housing 1.

The comparator of FIG. 1 is used with a microscope to perform accurate measurements on an object being observed under the microscope. The object may, for example, be a photograph. Thus, the end of barrel 11 opposite the end housing lens 10 extends to a microscope such as a microstereoscope (not shown) as indicated in FIG. 1.

Laser source 2 emits a narrow beam of light 7 which is reflected from mirror 4 to mirror 3 and then to lens 10. This beam of light, of course, travels down barrel 11 to the microscope where it is directed to the object and appears as a pin point source of light on the object being examined under the microscope. The end of barrel 11 associated with the microscope may be incorporated into the eyepiece of the microscope, the body of the microscope, or if the microscope is provided with a camera port this end of barrel 11 could be mounted in the camera port. The end of barrel 11 associated with the microscope would also normally have a lens, and a mirror or the like would be provided to direct the beam onto the microscope objective. A typical microscope is not shown since the microscope is not a part of the invention. Further, light beam 7 after it leaves barrel 11 can be directed to the object being observed by any well known optical means such as mirrors or lenses or both; and thus, it should not be necessary to show this directing apparatus. In addition, while light source 2 is specifically indicated as being a laser source, other light sources could be used. A laser source provides the necessary narrow beam and is, therefore, ideally suited for use with this invention. However, by utilizing an appropriate lens system, other light sources can also provide an appropriately narrow beam of light. The apparatus needed to provide a narrow beam of light with light sources other than laser sources is well known to those skilled in the art. The fact that other light sources can be used is specifically mentioned to show that this invention is not limited to a laser source. The important point is that beam 7 must be a very narrow beam of light no matter how derived so that the pin point of light is provided on the microscope image.

Now that the various elements of the FIG. 1 embodiment have been described, the operation can be described. Assume that a photograph is being viewed under the microscope. Light beam 7 can be directed to any point on the photograph by moving mirror 3 on its horizontal hinge 12 and by moving mirror 4 on its vertical hinge 13. Mirror 3 is rotated on its hinge 12 by means of shaft 14 and mirror 4 is rotated on its hinge by means of shaft 15. If hinges 12 and 13 are spring biased, rods 14 and 15 need merely push against their respective mirrors since the hinges will return the mirrors as the shafts are moved outwardly. If the hinges 12 and 13 are not spring biased, shafts 14 and 15 will have to be secured to the backs of mirrors 3 and 4, respectively. Shafts 14 and 15 are calibrated such that a given position of these shafts, and therefore a given position of the mirrors, represents a given x-y coordinate on the photograph under the microscope. Encoders 8 and 9, which are coupled to shafts 15 and 14 respectively, are any well known device that can read or sense the position of the shafts and give an output reading in terms of the x-y axes on the photograph when interrogated. Such devices are well known and are available on the market. The output from encoders 8 and 9 can be a visual output such as a digital meter or the like, but preferably for this invention encoders 8 and 9 provide an output that can be fed to a computer.

Assume now that the person viewing the film wants to measure the length of an object on the photograph or the distance between two points on the photograph. The operator merely moves threaded shafts 14 and 15 inward or outward by means of knobs 5 and 6, respectively, until the point of light from beam 7 is directly over one end of the object whose length is being measured or over the first point of two points between which the distance is desired. When the point of light is in its proper position, the operator interrogates encoders 8 and 9 which provide x-y axes outputs of the light position to a computer. The computer stores this information. The operator then moves the light source by means of knobs 5 and 6 to the other end of the object whose length is being measured or to the second of the two points between which the distance is being measured. When the point of light is in the proper second position on the photograph, the operator again interrogates encoders 8 and 9 which transmit the new x-y axes position of the light. The computer is so programmed that it can then be read out to provide the desired information. Of course, this information can be stored for later retrieval and a series of light positions can be read, stored on the computer and then the desired information relating to all of these positions can be read out of the computer.

Figure 2:
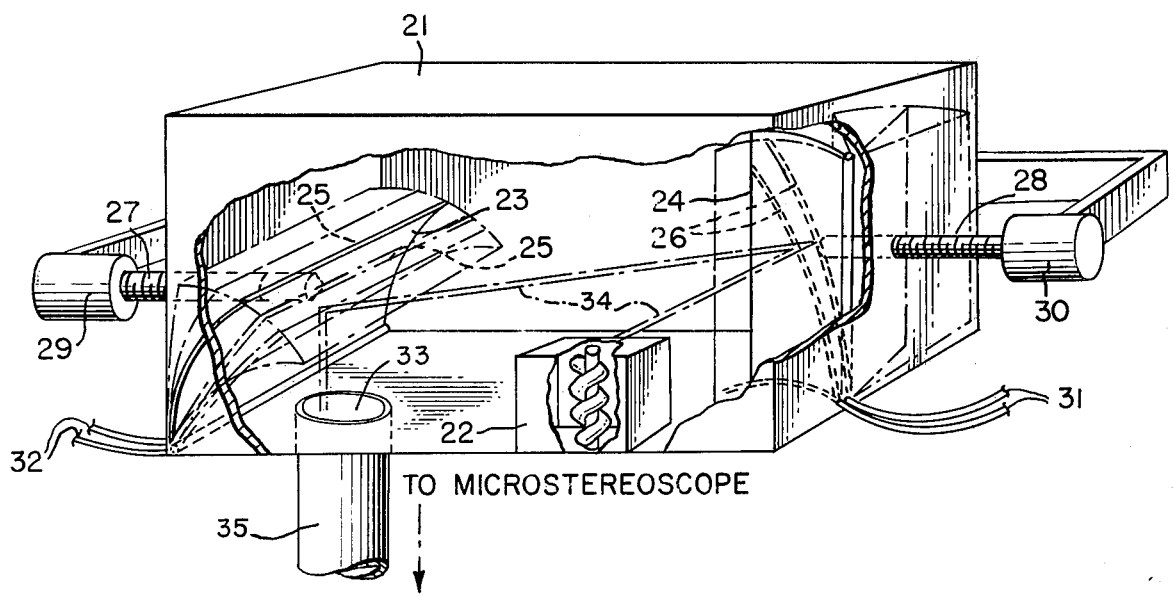
FIG. 2 shows a second embodiment of the invention.

In FIG. 1, the shafts 14 and 15 are moved inwardly or outwardly manually. These shafts could also be moved by means of small electric motors. A second embodiment of the microscope comparator of this invention using small electric motors is shown in FIG. 2. As shown in FIG. 2, this second embodiment includes a housing 21 that houses a first mirror 23, a second mirror 24 and a light source 22. Again, light source 22 may be a laser or other light source and appropriate optical elements that provide a narrow light beam such as the light beam 34.

A threaded rod or shaft 27 is operatively associated with mirror 23 and a threaded rod or shaft 28 is operatively associated with mirror 24. Shaft 27 is driven by means of a small electric motor 29, and shaft 28 is driven by means of a small electric motor 30. A lens barrel 35 having a lens 33 is shown protruding into housing 21. As was the case in FIG. 1, lens barrel 35 is shown protruding slightly into housing 21, but this end can be flush with the inside wall surface of housing 21. Also as in FIG. 1, the opposite end of barrel 35 (not shown) is operatively mounted to a microscope.

In the FIG. 1 embodiment, the mirrors are mounted on hinges. In the FIG. 2 embodiment, mirror 23 is rigidly attached at one edge to the bottom wall of housing 21 and mirror 24 is rigidly attached at one edge to the adjacent side wall of housing 21. A pair of strain gauges 25 are secured to the rear surface of mirror 23 and a pair of strain gauges 26 are attached to the rear of mirror 24. The electrical leads 32 are connected to strain gauges 25 and the electrical leads 31 are connected to strain gauges 26. The other end of each of the leads 31 and 32 are coupled to a computer.

The embodiment of FIG. 2 operates in the same basic manner as the embodiment of FIG. 1. In both embodiments the output from the comparator provides x-y axes information as to the location of the pin point of light on the microscope image. In FIG. 1 this information is provided by the positions of the rods or shafts. In FIG. 2 this information is provided by the strain gauges.

In the FIG. 2 embodiments of the comparator of this invention, the operator viewing the object under the microscope moves the pin point of light to the desired location by energizing motors 29 and 30. Of course, if the point of light is in the proper position along one of the axes, only the motor relating to the other axis need be energized. When motors 29 and 30 are energized, shafts 27 and 28 move either inward or outward depending upon the direction of rotation of the motors.

The mirrors are so secured at their one edge that the shafts bend the mirrors. Thus as shaft 27 moves inward, the bending of mirror 23 increases; and as it moves outward, the bending decreases. Similarly, as shaft 28 moves inward, the bending of mirror 24 increases; and as this shaft moves outward, the bending decreases. This movement of the mirrors 23 and 24 by bending shifts the position of the light beam 34 which results in a shift in the x-y axes of the pin point of light on the microscope image. As the bending of mirrors 23 and 24 increases or decreases, the output of their respective strain gauges 25 and 26 changes. Thus for a given bend in the mirrors, their respective strain gauges have a given output. The output of each set of strain gauges is transmitted to a computer by means of the associated leads 31 and 32. The computer is programmed to interpret the strain guage outputs as the x-y location of the point of light on the object being studied under the microscope. After the pin point of light is positioned in the first desired location, the output of the strain gauges is read by the computer and this information is processed and stored. The pin point of light is then moved to the next desired spot by changing the bending of the mirrors 23 and 24 and this x-y location of this second spot is read. At this point the distance between the spots can be read out of the computer, or the x-y location of the second position can be stored and additional spots located with the desired information relating to the various positions read out after all measurements are taken. In the discussion of the operation of both the FIG. 1 and FIG. 2 embodiments, at least two light spot positions were given as necessary to obtain, for example, the distance between two points on the object being observed. This would, of course, be the case in most instances. However, if the distance between a reference point, which could be a corner of the viewed object, and some point on the object is the desired measurement, obviously only one movement of the light spot would be required. The computer would read out the desired information with reference to the known reference point.

While it is undoubtedly apparent to those skilled in the art, it is here noted that it is a relatively simple matter to program a computer to provide almost any desired information regarding the relationship between any two points on the photograph in response to the x-y information provided by the comparators of FIGS. 1 and 2. Another fact that should be obvious to those skilled in the art is that various initial bits of information will have to be provided to the computer before the x-y information fed to the computer can be meaningfully processed by the computer. Some of this necessary information depends upon the point at which the lens tube 11 of FIG. 1 or lens tube 35 of FIG. 2 is mounted to the microscope. For example if the lens tube is mounted in the eyepiece, any microscope could be used with the apparatus of this invention by merely substituting this eyepiece for the conventional eyepeice. However, each time a different microscope is used, information about various parameters of that microscope would have to be fed to the computer in some well known fashion. With a single objective non-zoom microscope the parameters such as objective magnification and eyepiece magnification could be entered by means of a keyboard in a well known manner. If a multi-objective zoom microscope is used, then small well known encoders are needed to automatically transfer the necessary microscope parameter information to the computer. Similarly if the lens tube is mounted to the camera port of a microscope, zoom settings and multiple objective information must be provided to the computer. If the lens tube is mounted at a special port in the microscope body just before the objective lens, zoom setting encoding is eliminated but the other microscope parameters must be entered. What microscope parameter information must be entered into the computer for a given microscope and how this information is best entered is well known to those skilled in the art. The fact that such information must be entered is mentioned to give a complete and clear description of the operation of the invention.

As has been mentioned above the comparators of the invention can be mounted in the eyepiece of the microscope, the body of the microscope, or if the microscope has a camera port, in the camera port. Either of these three places is equally satisfactory; however, the necessary microscope parameters for a given location must, of course, be entered in the computer as mentioned above and the necessary optical directing equipment to properly direct the beam in the microscope must also be provided. While each of these three locations is satisfactory, each has its own advantages. If the lens tube is mounted in the eyepiece, the system can be used with any microscope which will accommodate that eyepiece. If a given microscope has a camera port, the lens tube can be mounted in this port without the necessity of providing a special port. If the lens tube is mounted in the microscope body, a port will have to be cut in the body but zoom encoding is eliminated. Thus where the lens tube 11 or 35 is mounted is really a matter of choice, the selection in any given case undoubtedly being dictated by the prevailing conditions. However, it should also be pointed out that optical apparatus needed to direct the narrow light beam can be eliminated depending upon where the lens barrel is incorporated into the microscope. For example, if the lens barrel is incorporated into the eyepiece, the pinpoint of light need not be directed onto the image since the eye will view the point of light as being on the image as is well known in the art.

In the above description of the operation of the invention, it was assumed that distance measurements were being made on a photograph. Obviously other information can be obtained with the comparators of this invention. For example, with more sophisticated computer programs the area, volume, height and other parameters of a given imagery can be obtained. Further, while this invention is ideally suited to the study of measurements of photographs by photo interpreters, the invention can be used to make measurements of blood cells, bacteria or the like.

While the invention has been described with reference to two specific embodiments, it will be apparent to those skilled in the art that various changes and modifications can be made to these embodiments without departing from the spirit and scope of the invention as set forth in the claims. For example, the strain gauges of FIG. 2 could be attached between the free end of the mirrors and the adjacent wall of the housing.

What is claimed is:

1. A microscope comparator comprising:
   a light source producing a very narrow beam of light;
   first movable means positioned in the path of said very narrow light beam for reflecting said very narrow light beam a first time;
   second movable means placed in the path of said light following said first movable means for reflecting said very narrow light beam a second time;
   first moving means operatively associated with said first movable means for moving said first movable means to thereby move said very narrow light beam in a first direction as said very narrow light beam is reflected said first time;
   second moving means operatively associated with said second movable means for moving said very narrow light beam in a second direction orthogonal to said first direction as said very narrow light beam is reflected said second time;
   directing means following said second movable means in the path of said very narrow light beam for directing said very narrow light beam onto a microscope image;
   first sensing means for providing an output indicative of the position of said very narrow light beam on said microscope image with respect to said first direction; and
   second sensing means for providing an output indicative of the position of said very narrow light beam on said image with respect to said second direction whereby each time said first and second movable means are moved by their respective moving means to thereby move the position of said very narrow light beam on said image, said first and second sensing means provide outputs indicating the position of said very narrow light beam on said image for each position of said first and second movable means.

2. A microscope comparator as defined in claim 1 wherein said first movable means is a first mirror having one edge mounted to a hinge and wherein said second movable means is a second mirror having one edge mounted to a hinge.

3. A microscope comparator as defined in claim 2 wherein said first moving means is a first threaded shaft associated with said first mirror in such a manner that said first mirror is rotated on its hinge by moving said first threaded shaft and wherein said second moving means is a second threaded shaft associated with said second mirror in such a manner that said second mirror is rotated on its hinge by moving said second threaded shaft.

4. A microscope comparator as defined in claim 3 wherein said first sensing means is a first encoder which senses the position of said first threaded shaft and wherein said second sensing means is a second encoder which senses the position of said second threaded shaft.

5. A microscope comparator as defined in claim 4 wherein said means to direct said very narrow light beam onto a microscope image is a lens barrel.

6. A microscope comparator as defined in claim 5 wherein said first and second mirrors, said light source and one end of said lens barrel are enclosed by a housing and wherein one end of said first threaded shaft extends into said housing with its other end extending outside said housing and one end of said second threaded shaft extends into said housing with its other end extending outside said housing.

7. A microscope comparator as defined in claim 6 wherein a knob is secured to said other end of said first threaded shaft and said threaded shaft is moved manually by rotating said knob secured thereto and wherein a knob is secured to said other end of said second threaded shaft and said second threaded shaft is moved by manually rotating said knob secured thereto.

8. A microscope comparator as defined in claim 6 wherein said first threaded shaft is moved by a first small electric motor operatively coupled to said other end of said first threaded shaft, said first small electric motor rotating said first threaded shaft clockwise and counterclockwise, and wherein said second threaded shaft is moved by a second small electric motor operatively coupled to said other end of said second threaded shaft, said second small electric motor rotating said second threaded shaft clockwise and counterclockwise.

9. A microscope comparator as defined in claim 7 wherein said light source is a laser light source.

10. A microscope comparator as defined in claim 8 wherein said light source is a laser light source.

11. A microscope comparator as defined in claim 1 wherein said first movable means is a mirror fixedly mounted along one edge and said second movable means is a second mirror fixedly mounted along one edge.

12. A microscope comparator as defined in claim 11 wherein said first moving means is a first threaded shaft associated with said first mirror in such a manner that said first threaded shaft bends said first mirror, said first threaded shaft increasing the degree of said bending of said first mirror as said first threaded shaft is moved in the direction toward said first mirror and decreasing the degree of said bending of said first mirror as said first threaded shaft is moved in the direction away from said first mirror, thereby moving said first mirror; and wherein said second moving means is a second threaded shaft associated with said second mirror in such a manner that said second threaded shaft bends said second mirror, said second threaded shaft increasing the degree of said bending of said second mirror as said second threaded shaft is moved in the direction toward said second mirror and decreasing the degree of said bending of said second mirror as said second threaded shaft is moved in the direction away from said second mirror, thereby moving said second mirror.

13. A microscope comparator as defined in claim 12 wherein said first sensing means comprises first strain gauge apparatus operatively associated with said first mirror and said second sensing means comprises second strain gauge apparatus operatively associated with said second mirror, said first strain gauge apparatus sensing the degree of said bending of said first mirror and said second strain gauge apparatus sensing the degree of said bending of said second mirror, whereby said first strain gauge apparatus and said second strain gauge apparatus provide output signals indicative of the position of said very narrow light beam on said microscope image for any given degree of bending of said first and second mirrors.

14. A microscope comparator as defined in claim 13 wherein said means to direct said very narrow light beam onto a microscope image is a lens barrel.

15. A microscope comparator as defined in claim 14 wherein said first and second mirrors, said light source and one end of said lens barrel are enclosed in a housing and wherein one end of said first threaded shaft extends into said housing with the other end extending outside said housing and one end of said second threaded shaft extends into said housing with its other end extending outside said housing.

16. A microscope comparator as defined in claim 15 wherein a knob is secured to said other end of said first threaded shaft and said threaded shaft is moved manually by rotating said knob secured thereto and wherein a knob is secured to said other end of said second threaded shaft and said second threaded shaft is moved by manually rotating said knob secured thereto.

17. A microscope comparator as defined in claim 15 wherein said first threaded shaft is moved by a first small electric motor operatively coupled to said other end of said first threaded shaft, said first small electric motor rotating said first threaded shaft clockwise and counterclockwise, and wherein said second threaded shaft is moved by a second small electric motor operatively coupled to said other end of said second threaded shaft, said second small electric motor rotating said second threaded shaft clockwise and counterclockwise.

18. A microscope comparator as defined in claim 16 wherein said light source is a laser light source.

19. A microscope comparator as defined in claim 17 wherein said light source is a laser light source.

* * * * *